United States Patent [19]

Hirai

[11] Patent Number: 4,767,972

[45] Date of Patent: Aug. 30, 1988

[54] NUMERICAL CONTROL EQUIPMENT

[75] Inventor: Hayao Hirai, Aichi, Japan

[73] Assignee: Mitsubishi Denki Kabushiki Kaisha, Tokyo, Japan

[21] Appl. No.: 906,716

[22] Filed: Sep. 12, 1986

[30] Foreign Application Priority Data

Dec. 2, 1985 [JP] Japan ................................ 60-270933

[51] Int. Cl.$^4$ ............................................ G06F 13/00
[52] U.S. Cl. ..................................... 318/565; 358/903
[58] Field of Search ...................... 18/565, 568, 568 D, 18/640; 901/46, 47; 358/903, 209; 364/513, 514, 559

[56] References Cited

U.S. PATENT DOCUMENTS

| 4,281,342 | 7/1981 | Ueda | 901/47 X |
| 4,344,146 | 8/1982 | Davis | 901/47 X |
| 4,445,185 | 4/1984 | Davis | 901/46 X |
| 4,567,515 | 1/1986 | Schumacher | 358/107 |
| 4,654,708 | 3/1987 | de la Guardia | 358/903 X |

OTHER PUBLICATIONS

Jarvis, R. A., "A Computer Vision and Robotics Laboratory", Jun. 1982, IEEE publication 0018-9162/82/06-00-0008, pp. 8-22.

"Video Slice-Profile Adaptor, Model 147"Hamamatsu, received in PTO Scientific Library, 10/1983, 4 pages.

Primary Examiner—Bentsu Ro
Attorney, Agent, or Firm—Sughrue, Mion, Zinn, Macpeak, and Seas

[57] ABSTRACT

In a numerical control equipment in which an image signal from an image unit and a display signal from a central processing unit (CPU) of the numerical control equipment are displayed on a single display unit selectively by a switching means provided in the apparatus, the display unit is driven in response to a synchronizing signal from the CPU and the equipment is equipped with a synchronized image signal feeding means for supplying the image signal to an input interface of the equipment in response to the synchronizing signal. With this construction, the input interface can be used commonly for various image units regardless of the type and characteristics thereof.

7 Claims, 3 Drawing Sheets

FIG. I
PRIOR ART

NUMERICAL CONTROL EQUIPMENT

BACKGROUND OF THE INVENTION

The present invention relates to a numerical control equipment having a display unit capable of displaying image information supplied from an external control unit.

PRIOR ART

Japanese Patent Application Non-Examined Publication No. 24942/1984 discloses a numerical control equipment having a device for producing a video signal indicative of character or image informations and switching means for selectively supplying the video signal and a video signal supplied from an image device selected for the apparatus on a cathode ray tube (CRT), the image device being a video camera.

A digital radiography apparatus is disclosed in Onoe, "Medical Image Processing Apparatus", Journal of the Japan Society of "Precision Engineering", vol. 48, No. 5, May 1982, pp 47 (FIG. 8). A video signal produced by a video camera associated with the apparatus on the basis of a signal obtained from a collimated output of an X-ray tube through a specimen is A-D converted. A resultant digital signal is image-processed and displayed on a monitor television.

Japanese Patent Application No. 112788/1984 assigned to the assignee of the present application deals with a display of a video signal supplied from an external control unit on a CRT of a numerical control equipment.

FIG. 1 which corresponds to the content of the latter Japanese Patent Application is a block diagram of a construction of the numerical control equipment in which a main control portion thereof depicted by a reference numeral 1 includes a memory unit 2 composed of RAMs and ROMs, etc., for storing a program, machining information, etc., to be performed, a central processing unit (CPU) 3, an arithmetic logic unit 4 for performing various operations according to program instructions stored in the memory unit 2 and read out by the CPU 3, an input interface 5 for receiving machining information from an input unit 8 composed of a tape reader, a setting data display board and machine tool operation panel, etc., and supplying the input data to the CPU 3, output interfaces 6 and 7 for passing instruction signals from the CPU 3 to a display 9 which may be a cathode ray tube or the like and functions to display the data signal supplied from the CPU 3 through the output interface and the video signal, selectively, and a servo mechanism 10, respectively, an input interface 15 and a switching unit 16 under control of the CPU 3.

A video signal from an external control unit including an image unit 12 such as video camera is supplied through the interface 15, the switching unit 16 and the output interface 6 to the display 9. On the other hand, the data signal of the numerical control equipment inputted from the input unit 8 is supplied from the CPU 3 through the switching unit 16 and the output interface 6 to the display unit 9. The switching unit 16 is responsive to an instruction from the CPU 3 to select either the video signal or the data signal to be supplied to the display unit 9.

The servo mechanism 10 is composed of a power supply board and a drive portion, etc. and functions to drive a machine tool 11 to be controlled according to instructions stored in the memory unit 2 and read out by the CPU 3, through the output interface 7.

In such apparatus in which the machining information supplied from the input device 8 is fed through the input interface 5, the CPU reads out the program stored in the memory unit 2 upon reception of the machining information and instructs the arithmetic logic unit 4 to operate the data according to the program. The CPU 3 provides a certain operational instruction signal according to a result of the data operation, which is fed through the output interface 7 to the servo mechanism 10. An operation of the machine tool 11 is controlled by the servo mechanism.

In any of the conventional apparatus mentioned hereinbefore, the external control unit, i.e., the image unit, has to be selected so as to match the input interface of the apparatus because a construction of the input interface depends upon characteristics of the image unit, such as frequency characteristics and a coding system thereof. However, it is often desired to use various image unit in association with an equipment. This is particularly true when the equipment is a numerical control equipment. In the conventional numerical control equipment, however, it is impossible to change one image unit to another without changing the input interface to another suitable for the another image unit. This is a remarkable disadvantage in a mass production of numerical control equipment.

SUMMARY OF THE INVENTION

An object of the present invention is to provide a numerical control equipment capable of making an externally supplied image signal uniform regardless of the type of an image unit so that any image unit responsive to either visible light or invisible light such as infrared, far-infrared, ultraviolet or X ray, etc. can be associated with the equipment including an input interface having a certain fixed construction. With the flexibility of selection of the image unit for a given input interface, it is possible to remarkably improve the productivity of numerical control equipment.

According to an embodiment of the present invention, a numerical control equipment includes a display unit which is driven on the basis of a synchronizing signal supplied from a central processing unit (CPU) of the equipment and a synchronized image signal feeding means for supplying an image signal synchronized with the synchronizing signal to an input interface of the equipment.

According to the numerical control equipment of the present invention, the input interface thereof can be used commonly for any kind of image unit because an image signal from such image unit is converted into a synchronized image signal on the basis of the synchronizing signal from the CPU of the equipment.

DESCRIPTION OF THE PREFERRED EMBODIMENTS

Figure 1:
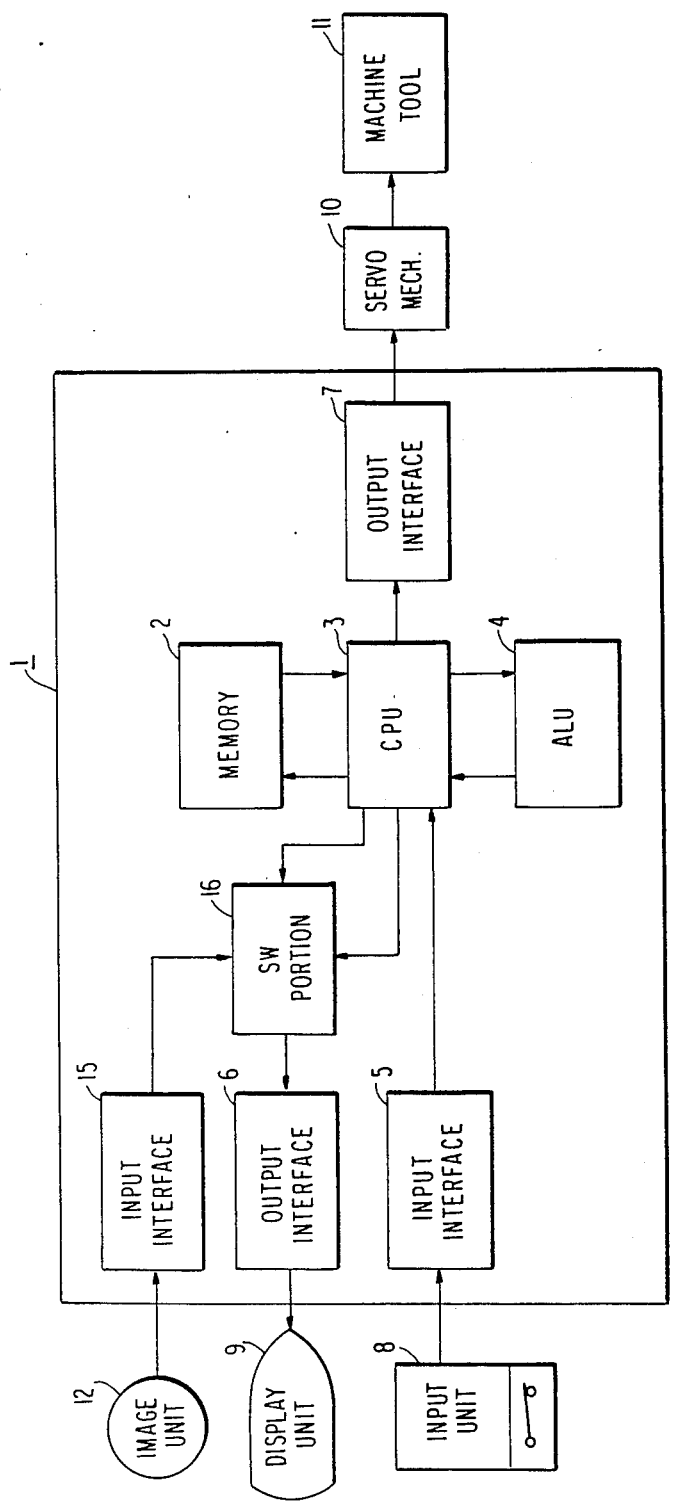
FIG. 1 shows a contruction of a conventional numerical control equipment, schematically.
Figure 2:
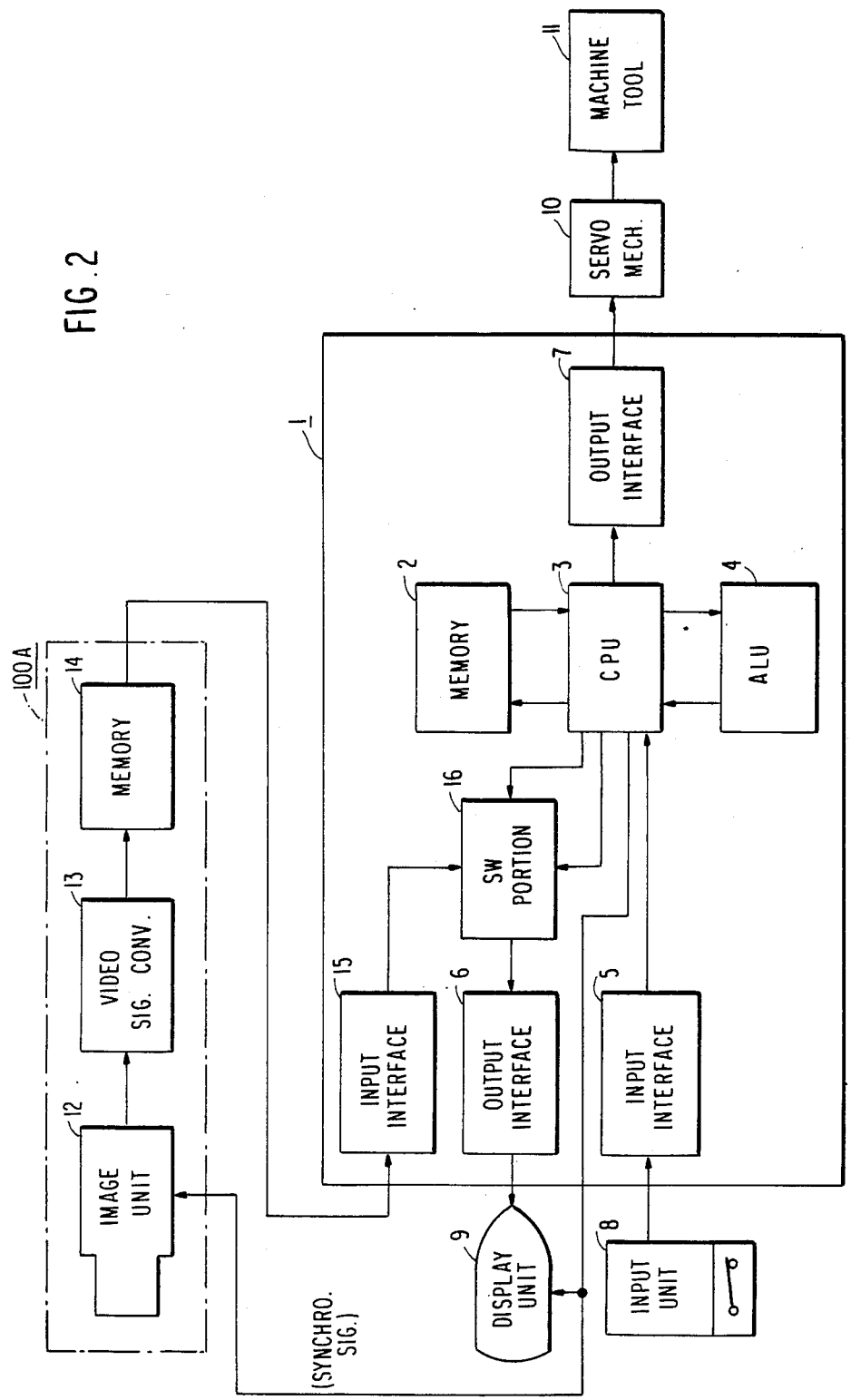
FIG. 2 shows a construction of an embodiment of a numerical control equipment according to the present invention.

An embodiment of the present invention will be described with reference to FIG. 2. In FIG. 2, same components as those shown in FIG. 1 are depicted by same reference numerals, respectively, and, therefore, further descriptions thereof are omitted for simplicity of explanation.

In the embodiment shown in FIG. 2, a display unit 9 is driven according to a synchronizing signal supplied from a central processing unit 3 included in a main control portion 1 of the numerical control equipment.

According to the present invention, the main control portion 1 is associated with a synchronized image signal feeding means 100A. The synchronized image signal feeding means 100A comprises an image unit 12, e.g., a video camera, a video signal converter 13 for converting an image signal from the image unit 12 into a video signal and a memory unit 14 for storing the video signal from the video signal converter 13. The memory unit 14 is connected to an input interface 15 of the main control portion 1 of the numerical control equipment. Therefore, the image signal from the image unit 12 is supplied to the input interface 15 of the main control portion 1 without synchronous conversion thereof. The image unit 12 is driven in synchronism with the synchronizing signal from the CPU 3 of the main control portion 1.

Therefore, the image signal from the image unit 12 is supplied through the video signal converter 13, the memory unit 14, the input interface 15, a data switching unit 16 for selecting either an information from the image unit 12 or an information from an input unit 8 and an output interface 6 to the display unit 9. As shown, the image signal from the image unit 12 can be sent to and displayed by the display unit 9 without any synchronous conversion.

Figure 3:
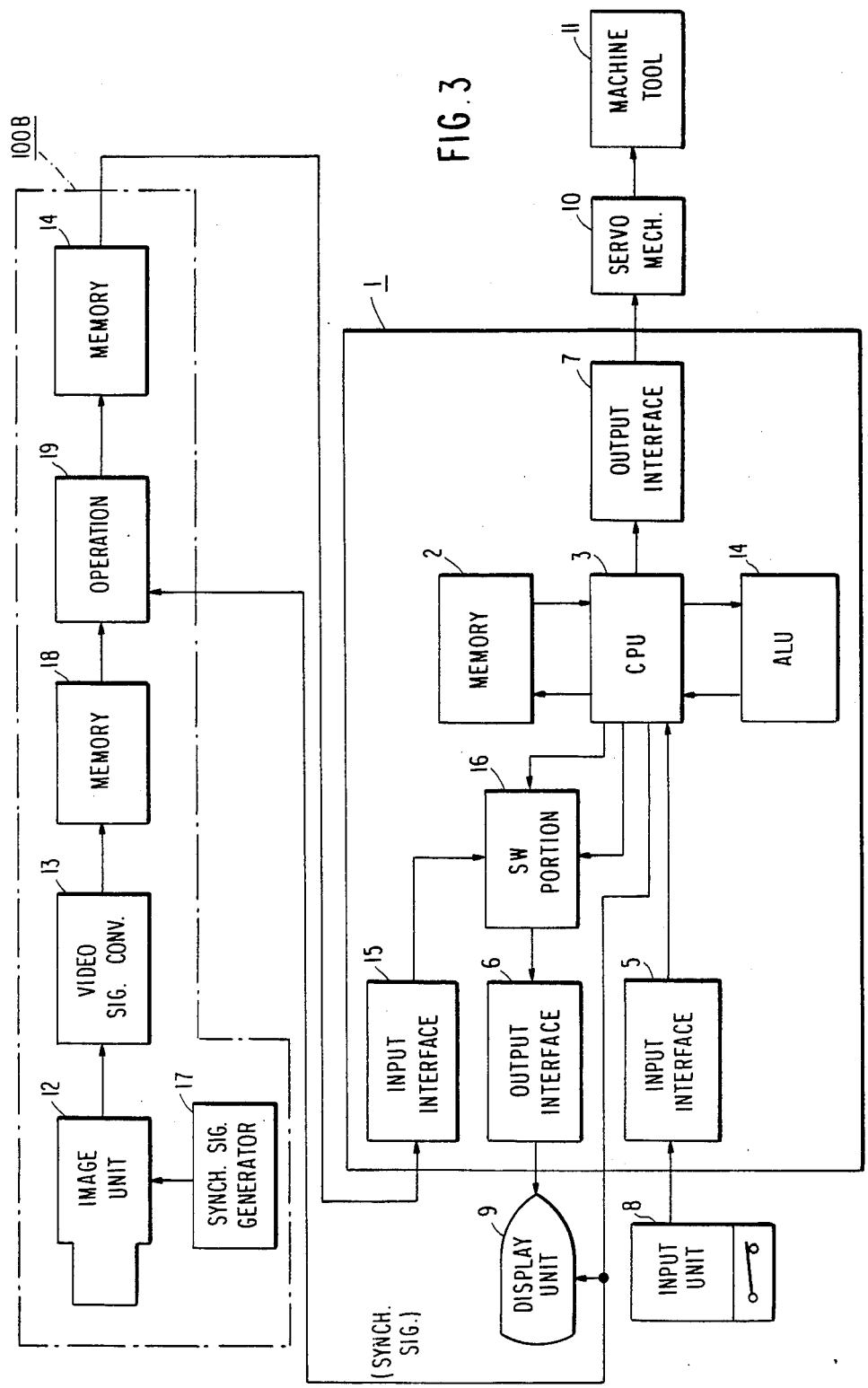
FIG. 3 shows a construction of another embodiment of the present invention.

FIG. 3 shows another embodiment of the present invention which differs from the embodiment shown in FIG. 2 in that the synchronized image signal feeding means 100A in FIG. 2 is replaced by a synchronized image signal feeding means 100B.

The synchronized image signal feeding means 100B comprises an image unit 12, a synchronizing signal generator 17 for supplying a synchronizing signal to the image unit 12, a video signal converter 13 for converting an image signal from the image unit 12 into a video signal, a memory unit 18 for storing the video signal, an arithmetic logic unit (ALU) 19 for obtaining a synchronized image signal by synchronous conversion of the image signal supplied from the image unit 12 through the memory unit 18 according to the synchronizing signal from the CPU 3 and a memory unit 14 for storing an output of the ALU 19. The memory unit 14 is connected to the input interface 15 of the main control portion 1 to supply the stored output of the ALU 19 thereto.

Therefore, the image signal from the image unit 12 is converted, by the video signal converter 13, into a signal having a form suitable for memorization in the memory unit 18 and stored therein. Then, in the ALU 19, the stored signal is converted into a synchronized image signal synchronized by the same synchronizing signal as that of the display unit 9 and supplied through the memory unit 14, the input interface 15, the data signal switching unit 16 and the output interface 6 to the display unit 9.

The synchronizing signal to be supplied to the image unit 12 is provided by the synchronizing signal generator 17 rather than the CPU 3. That is, the image unit used can be supplied with an optimum synchronizing signal therefor.

As mentioned above, in the present invention, the image unit which is sensitive to either visible light wavelength range or invisible light wavelength range, such as infrared, far-infrared, ultraviolet or X ray, can be driven by either the synchronizing signal from the CPU 3 or from the synchronizing signal generator 17. In the latter case, the video signal synchronized by the synchronizing signal from the synchronizing signal generator 17 is converted, in the ALU 19, with the same synchronizing signal as that of the display unit 9. Therefore, the input interface 15 can be used commonly, resulting in a facilitated mass-production of the numerical control equipment with minimum expense and maximum reliability.

Further, as it is possible to use an image unit sensitive to invisible light, it becomes possible to display, on the display unit, an image of a portion of a workpiece which is under cutting and which is disposed in a dark or covered by a cutting fluid and is usually invisible. This ability of the present invention can be also applied to various other industrial fields than the numerical control equipment.

As described hereinbefore, the input interface of the present numerical control equipment can be commonly used for various image unit regardless of the type or kind thereof because the image signal from such external image unit is synchronized, in operation, by the synchronizing signal from the CPU of the equipment.

It should be noted that, although the synchronized image signal feeding device 100A or 100B is shown in block form, it is easy for those skilled in the art to design such device without difficulty.

What is claimed is:

1. A numerical control equipment, comprising:
   a numerical control portion including a central processing unit, a storage means for storing a program, arithmetic logic means for performing operations according to said program, said program being read out by said central processing unit, an input interface, an output interface, and switching means responsive to an instruction from said central processing unit to selectively supply image informations from said central processing unit and from said input interface to said output interface, said central processing unit being adapted to produce a synchronizing signal;
   external image means connected to said input interface for supplying an image signal thereto, and connected to said central processing unit for receiving said synchronizing signal such that a synchronized image signal is supplied from said external image means to said input interface; and
   display means connected to said output interface, said display means being adapted to display, selectively, said image informations from said central processing unit and said input interface, said display means being connected to said central processing unit for receiving said synchronizing signal such that said display means is driven according to said synchronizing signal.

2. The numerical control equipment as claimed in claim 1 wherein said external image means comprises an image unit connected to said central processing unit for receiving said synchronizing signal, a video signal converter for converting an image signal from said image unit into a video signal, and a memory unit for storing said video signal.

3. The numerical control equipment as claimed in claim 2, wherein said image unit is a video camera sensitive to a wavelength range of visible light.

4. The numerical control equipment as claimed in claim 2, wherein said image unit is a video camera sensitive to a wavelength range of invisible light including infrared ray, far-infrared ray, ultraviolet ray and X ray.

5. A numerical control equipment, comprising a numerical control portion including a central processing unit, a storage means for storing a program, arithmetic logic means for performing operations according to said program, said program being read out by said central processing unit, an input interface, an output interface, and switching means responsive to said central processing unit to selectively supply image informations from said central processing unit and from said input interface to said output interface, said central processing unit being adapted to produce a first synchronizing signal;

external image means comprising an image unit, a synchronizing signal generator for generating a second synchronizing signal for said image unit, a video signal converter for converting an image signal from said image unit into a video signal, a first memory unit for storing said video signal, operation means connected to said central processing unit for receiving said first synchronizing signal and for synchronously converting said video signal from said first memory unit in synchronism with said first synchronizing signal, and a second memory unit for storing an output of said operation means; and display means connected to said output interface, said display means being adapted to selectively display said image information from said central processing unit and said input interface, said display means being connected to said central processing unit for receiving said first synchronizing signal;

whereby said display means is driven according to said first synchronizing signal, and a synchronized image signal is supplied from said external image means to said input interface.

6. The numerical control equipment as claimed in claim 5, wherein said image unit is a video camera sensitive to a wavelength of visible light.

7. The numerical control equipment as claimed in claim 5, wherein said image unit is a video camera sensitive to a wavelength of invisible light including infrared ray, far-infrared, ultraviolet ray and X ray.

* * * * *